United States Patent [19]
Titterington et al.

[11] Patent Number: 5,780,528
[45] Date of Patent: Jul. 14, 1998

[54] ISOCYANATE-DERIVED COLORED RESINS FOR USE IN PHASE CHANGE INK JET INKS

[75] Inventors: Donald R. Titterington, Tualatin; Jeffery H. Banning, Hillsboro, both of Oreg.; Loc V. Bui, Valencia, Calif.; Clifford R. King, Salem, Oreg.

[73] Assignee: Tektronix, Inc., Wilsonville, Oreg.

[21] Appl. No.: 672,617

[22] Filed: Jun. 28, 1996

[51] Int. Cl.$^6$ .................................................. C09D 5/00
[52] U.S. Cl. .................. 523/161; 106/31.29; 106/31.43; 106/31.61
[58] Field of Search .................. 523/161; 106/31.29, 106/31.43, 31.61

[56] References Cited

U.S. PATENT DOCUMENTS

| | | | |
|---|---|---|---|
| 3,653,932 | 4/1972 | Berry et al. | 106/22 |
| 3,994,835 | 11/1976 | Wolf et al. | 260/2.5 |
| 4,132,480 | 1/1979 | Hugl et al. | 521/167 |
| 4,284,729 | 8/1981 | Cross et al. | 521/158 |
| 4,390,369 | 6/1983 | Merritt et al. | 106/31 |
| 4,484,948 | 11/1984 | Merritt et al. | 106/31 |
| 4,507,407 | 3/1985 | Kluger et al. | 521/113 |
| 4,684,956 | 8/1987 | Ball | 346/1.1 |
| 4,751,254 | 6/1988 | Kluger et al. | 521/163 |
| 4,846,846 | 7/1989 | Rekers et al. | 8/515 |
| 4,851,045 | 7/1989 | Taniguchi | 106/31 |
| 4,889,506 | 12/1989 | Connolly et al. | 439/874 |
| 4,889,560 | 12/1989 | Jaeger et al. | 106/27 |
| 4,889,761 | 12/1989 | Titterington et al. | 428/195 |
| 4,912,203 | 3/1990 | Kluger et al. | 534/729 |
| 5,006,170 | 4/1991 | Schwarz et al. | 106/20 |
| 5,151,120 | 9/1992 | You et al. | 106/27 |
| 5,221,335 | 6/1993 | Williams et al. | 106/23 |
| 5,270,363 | 12/1993 | Kluger et al. | 524/90 |
| 5,290,921 | 3/1994 | Moody et al. | 534/607 |
| 5,372,852 | 12/1994 | Titterington et al. | 427/288 |
| 5,389,958 | 2/1995 | Bui et al. | 347/103 |
| 5,496,879 | 3/1996 | Griebel et al. | 524/320 |

FOREIGN PATENT DOCUMENTS

| | | |
|---|---|---|
| 0187352 | 7/1986 | European Pat. Off. . |
| 0206286 | 12/1986 | European Pat. Off. . |
| 2294939 | 5/1996 | European Pat. Off. . |
| 4205636 | 8/1993 | Germany . |
| 4205713 | 8/1993 | Germany . |
| 9520470 | 10/1995 | United Kingdom . |
| 9404619 | 3/1994 | WIPO . |
| 9414902 | 7/1994 | WIPO . |
| 9602399 | 9/1996 | WIPO . |
| 9602446 | 10/1996 | WIPO . |

OTHER PUBLICATIONS

"Polymer Chemistry –The Basic Concepts" by Paul C. Hiemenz, California State Polytechnic University, Pomona, California, p. 7.

"Technical Product Information" Luxate® Isophorone Diisocyanate, by Olin Chemicals, Olin Corporation, 2 pages.

"Advanced Organic Chemistry" Reactions, Mechanisms, and Structure, Third Edition, by Jerry March, Professor of Chemistry, Adelphi University, 6 pages.

"Colour and Constitution of Organic Molecules" by John Griffiths, Leads, England, 1976, Academic Press Inc. (London) Ltd., London, p. 82.

*Primary Examiner*—Edward J. Cain
*Attorney, Agent, or Firm*—Ralph D'Alessandro

[57] ABSTRACT

Isocyanate-derived colored resins made by reacting an alcohol and/or amine, an isocyanate and a nucleophilic molecule containing a chromogen are disclosed. The isocyanate-derived colored resins are useful as colorant materials in phase change ink compositions.

35 Claims, No Drawings

ISOCYANATE-DERIVED COLORED RESINS FOR USE IN PHASE CHANGE INK JET INKS

BACKGROUND OF THE INVENTION

1. Field of the Invention

The present invention relates to colored resins made by reacting isocyanates with combinations of selected nucleophiles such as alcohols and/or amines. All or part of the selected nucleophiles of the invention can contain a chromogen which enables the resin to absorb light. The present invention also relates to phase change ink compositions, both generally and specific compositions, containing such colored resins. Still further, the present invention relates to the process of using such phase change inks containing such colored resins in a printing device.

2. Description of the Relevant Art

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops. Phase change inks have also been used in other printing technologies such a gravure printing as referenced in U.S. Pat. No. 5,496,879 and German Patent publications DE 4205636AL and DE 4205713AL assigned to Siegwerk Farbenfabrik Keller, Dr. Rung and Co.

Phase change inks for color printing generally comprise a phase change ink carrier composition which is combined with a phase change ink compatible colorant. Preferably, a colored phase change ink will be formed by combining the above-described ink carrier composition with compatible subtractive primary colorants. The subtractive primary colored phase change inks of this invention can comprise four component dyes, namely, cyan, magenta, yellow and black. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,506; 4,889,761; and 5,372,852 teach that the subtractive primary colorants employed typically may comprise dyes from the classes of Color Index (C.I.) Solvent Dyes, Disperse Dyes, modified Acid and Direct Dyes, and a limited number of Basic Dyes. The colorants can also include pigments as exemplified in U.S. Pat. No. 5,221,335, assigned to Coates Electrographics LTD. U.S. patent application Ser. No. 08/381,610, filed Jan. 30, 1995, and assigned to Tektronix, Inc., is directed to the use of a specific class of polymeric dyes in phase change ink compositions.

Phase change inks have also been used for applications such as postal marking or industrial marking and labelling.

Phase change inks are desirable for ink jet printers since they remain in a solid phase at room temperature, during shipping, long-term storage, and the like. Also, the problems associated with nozzle clogging due to ink evaporation are largely eliminated, thereby improving the reliability of ink jet printing. Furthermore, in the above-noted prior art phase change ink jet printers where the ink droplets are applied directly onto the printing medium the droplets solidify immediately upon contact with the substrate, migration of ink along the printing medium is prevented and dot quality is improved. This is also true of the processes and ink compositions described herein.

In addition to the above-referenced U.S. patents, many other patents describe materials for use in phase change ink jet inks. Some representative examples include U.S. Pat. Nos. 3,653,932; 4,390,396; 4,484,948; 4,684,956; 4,851,045; 4,889,560; 5,006,170; and 5,115,120; as well as EP Application Nos. 0187352 and 0206286. These materials can include paraffins, microcrystalline waxes, polyethylene waxes, ester waxes, fatty acids and other waxy materials, sulfonamide materials, resinous materials made from different natural sources (tall oil rosins and rosin esters are an example) and many synthetic resins, oligomers, polymers and co-polymers.

Separately, PCT Patent Application WO 94/14902, which was published on Jul. 7, 1994 and is assigned to Coates Brothers PLC, teaches a hot melt ink containing a colorant and, as a vehicle for said hot melt ink, an oligourethane having a melting point of at least 65° C. and obtained by reacting an aliphatic or aromatic diisocyanate with at least a stoichiometric amount of either: (i) a monohydric alcohol component; or (ii) a monohydric alcohol component followed by another different monohydric alcohol component; or (iii) a monohydric alcohol component, followed by a dihydric alcohol component, followed by a monohydric alcohol component.

This PCT patent application defines the monohydric alcohol component as either a monohydric aliphatic alcohol (e.g. $C_1$ to $C_{22}$ alcohols), an etherified dihydric aliphatic alcohol (e.g. propylene glycol methyl ether (PGME), dipropylene glycol methyl ether (DPGME), ethylene glycol butyl ether (EGBE), diethylene glycol butyl ether (DEGBE), tripropylene glycol butyl ether (TPGBE) and propylene glycol phenyl ether (PGPE); esterified dihydric aliphatic alcohol (e.g. the esterifying acid may be an ethylenically unsaturated acid (such as acrylic acid or methacrylic acid), thereby introducing ethylenic unsaturation into the oligourethane and rendering it suitable for further additional polymerization (curing) after having been applied to a substrate by hot melt printing); or dihydric polyalkylene glycol. This PCT Application further defined the dihydric alcohol component as a dihydric aliphatic alcohol or a dihydric polyalkylene glycol (e.g. ethylene glycol, polyethylene glycol (PEG 1500), polypropylene glycol (PPG 750, 1000 and 1500), trimethylene glycol, dipropylene glycol, methylpropanediol and 1,6-hexanediol).

Also, PCT Patent Application WO 94/04619, assigned to the General Electric Company, teaches the use of ionomeric materials in combination with image forming agents to form a hot melt ink jet ink. The ionomeric materials can include many different types of copolymeric or polymeric ionomers, including carboxyl-functional polyurethanes prepared from a diol or polyol and a hydroxyl acid. Many other carrier materials and colorants for the image forming agent of the invention are included in the PCT application.

As the number of applications of phase change inks have increased, there has evolved the need for new colorant materials that are suitable for these different applications. There is also a need for relatively low viscosity non-polymeric resins designed for phase change ink jet and other forms of phase change ink printing. The present invention offers a solution to these needs by combining in the same material a chromogen and a resin designed for phase change ink printing.

BRIEF SUMMARY OF THE INVENTION

It is an aspect of the present invention that colored urethane compounds comprising the reaction product of selected isocyanates with mixtures of selected alcohols or mixtures of selected alcohols and chromogen-containing nucleophiles are obtained.

It is another aspect of the present invention that colored urea compounds comprising the reaction product of selected isocyanates with selected amines or mixtures of selected amines and chromogen-containing nucleophiles are obtained.

It is still another aspect of the present invention that colored urethane/urea compounds comprising the reaction product of selected isocyanates with selected alcohols or mixtures of selected alcohols, and/or amines or mixtures of selected amines, and chromogen-containing nucleophiles are obtained.

It is still a further aspect of the present invention that a phase change ink composition comprising an admixture of (a) a phase change carrier composition and (b) a compatible phase change ink colorant comprising at least one colored isocyanate-derived resin is obtained.

It is yet another aspect of the present invention that a method for producing a layer of a phase change colored ink on the surface of a substrate by either direct or indirect printing is obtained wherein the phase change ink composition in the solid phase comprises an admixture of (a) a phase change carrier composition and (b) a compatible phase change ink colorant comprising at least one colored isocyanate-derived resin.

It is a feature of the present invention that the colored isocyanate-derived resin reaction product of the selected isocyanates with selected alcohols or mixtures of selected alcohols and/or selected amines or mixtures of selected amines obviates the need for the use of a separate plasticizer when the resin is employed in an ink formulation because the resulting ink is sufficiently malleable and ductile on its own.

It is another feature of the present invention that the isocyanate-derived resins of the present invention are transparent and incorporate a colorant, such as a dye.

It is an advantage of the present invention that the colored isocyanate-derived resins can be design engineered to obtain desired properties for specific printing platforms and architectures.

It is another advantage of the present invention that the colored isocyanate-derived resins are very pure, being free of salts and other insoluble contaminants.

It is yet another advantage of the present invention that the colored isocyanate-derived resins of the present invention, when used in conjunction with a typical carrier composition in a phase change ink formulation, obviate the need for a separate colorant.

It is yet a further advantage of the present invention that the colored isocyanate-derived resins may be substituted for one or more components in prior fatty amide containing phase change inks, such as the tetra-amide, mono-amide, tackifier, or plasticizer components.

These and other aspects, features and advantages are obtained by the use of reaction products of selected isocyanates with selected alcohols or mixtures of selected alcohols and/or selected amines or mixtures of selected amines, some or all of which may contain a chromogen, to produce isocyanate-derived resins suitable for use in phase change inks that may be employed in direct or indirect printing applications.

DESCRIPTION OF THE PREFERRED EMBODIMENTS

The term "chromogen" in the present specification and claims is used as defined on page 82 of "Colour and Constitution of Organic Molecules", by John Griffiths, ©1976 by Academic Press, to mean a reasonably well defined unsaturated system that is either colored, or can be rendered colored by the attachment of simple substituents.

The term "nucleophile" in the present specification and claims is used as defined on page 179 of "Advanced Organic Chemistry, 3rd Edition" by Jerry March, ©1985 by John Wiley and Sons, to describe a reagent that brings an electron pair to a reaction to form a new bond. The preferred nucleophiles of this invention are alcohols, amines and chromogen-containing alcohols or amines, but it is understood that other nucleophilic functional groups that are capable of reacting with the isocyanate moiety could also be used in the invention.

The term "oligomer" in the current specification and claims is used as defined on page 7 of "Polymer Chemistry—The Basic Concepts" by Paul Hiemenz, ©1984 by Marcel Dekker, Inc., to describe a term coined to designate molecules for which n (representing the number of repeating monomer units) is less than 10.

The term "colored isocyanate-derived resin" as used in the present specification and claims is defined as any monomeric, oligomeric or nonpolymeric resinous material derived from the reaction of mono-, di-, or poly-isocyanates with a suitable nucleophilic molecule containing a chromogen, the mixture of a monofunctional alcohol and a suitable nucleophilic molecule containing a chromogen, the mixture of a monofunctional amine and a suitable nucleophilic molecule containing a chromogen, or the mixture of a monofunctional alcohol, a monofunctional amine and a suitable nucleophilic molecule containing a chromogen.

Preferred alcohols to react with difunctional and higher isocyanates to make the isocyanate-derived resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso)-propanol, (n-, iso-, t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol [e.g., benzyl alcohol, octyl, nonyl, and dodecylphenol alkoxylates of octyl, nonyl, and dodecylphenol, and alkoxyphenol]; aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like). It will be obvious to those skilled in the art that small amounts (on a molar basis) of polyols could also be incorporated into the reaction mixture to produce oligomeric species in the resins if so desired. The preferred alcohols are hydroabietyl alcohol, octylphenol ethoxylate and octadecyl alcohol.

Preferred alcohols to react with monofunctional isocyanates to make the isocyanate-derived resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso-) propanol, (n-, iso-, and t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n-and branched) undecanols, (n- and branched) dodecanols, (n- and branched) hexadecanols, (n- and branched) octadecanols, 3-cyclohexyl-1-propanol, 2cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol (e.g., benzyl alcohol, octyl, nonyl, and dodecylphenol alkoxylates or octyl, nonyl, and dodecylphenol, alkoxyphenol); aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like), as well as multifunctional alcohols such as ethylene glycol, diethylene glycol, triethylene glycol, dimethylolpropionic acid, sucrose, polytetramethylene glycol (MW<~3000), polypropylene glycol (MW<~3000), polyester polyols (MW<~3000), polyethylene glycol (MW<~3000), pentaerythritol, triethanol amine, glycerin, 1,6-hexanediol, N-methyl-N,N-diethanol amine, trimethylol propane, N,N,N',N'-tetrakis(2-hydroxypropyl) ethylenediamine, and the like. The preferred alcohol is octadecanol.

Preferred amines to react with monofunctional isocyanates to make the isocyanate-derived resins of this invention include any monofunctional amine, with the exception of tertiary amines void of other nucleophilic functional groups (e.g., triethylamine). For instance, the monoamine could be any aliphatic primary or secondary amine [e.g., a $C_1-C_{22}$ or higher linear amine, any branched amine or any cyclic aliphatic amine such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n-and branched) undecyl amine, (n- and branched) octadecyl amine, (n- and branched) hexadecyl amine, (n- and branched) dodecyl amine, dimethyl amine, diethyl amine, di(n-, and iso-)propyl amine, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)octadecyl amine, di(n-, iso-, t-, and the like)dodecyl amine, cyclohexyl amine, 2,3-dimethyl-1-cyclohexylamine, piperidine, pyrrolidine, and the like]; any aliphatic/aromatic amines (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine; isonipecotamide; polyoxyalkylenemono-, di-, or triamines, such as M-, D-, and T-series Jeffamines available commercially from Huntsman Chemical Company of Austin, Tex.; 3,3'-diamino-N-methyl-dipropylamine, and the like; as well as multifunctional amines such as polyethylene imine; ethylene diamine; hexamethylene diamine; isomers of cyclohexyldiamines; 1,3-pentadiamine; 1,12-dodecanediamine; 3dimethylaminopropylamine; 4,7,10-trioxa-1,13-tridecanediamine; diethylene triamine; 3,3-diamino-N-methyldipropylamine; tris(2-aminoethyl)amine, and the like.) The preferred amine is octadecylamine.

Preferred amines to react with difunctional and higher isocyanates to make the isocyanate-derived resins of this invention include any monofunctional amine, with the exception of tertiary amines void of other nucleophilic functional groups (e.g., triethylamine). For instance, the monoamine could be any aliphatic primary or secondary amine (e.g., a $C_1-C_{22}$ or higher linear amine, any branched amine or any cyclic aliphatic amine) such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amines, (n- and branched) dodecyl amines, (n- and branched) hexadecyl amines, (n- and branched) dodecyl amines, dimethyl amine, diethyl amine, di(n-and iso-)propyl amines, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)dodecyl amine, di(n-, iso-, t-, and the like)octadecyl amine, cyclohexyl amine, 2,3-dimethyl-1-cyclohexylamine, piperidine, pyrrolidine, and the like; an aliphatic/aromatic amine (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine; isonipecotamide; polyoxyalkylenemonoamines, such as M-series Jeffamines available commercially from Huntsman Chemical Company of Austin, Tex.; 3,3'-diamino-N-methyl-dipropylamine; and the like.) It will be obvious to those skilled in the art that small amounts (on a molar basis) of polyamines could also be incorporated into the reaction mixture to produce oligomeric species in the resins if so desired. The preferred amine is octadecyl amine.

Additionally, hydroxyl/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of this include ethanolamine, diethanolamine, and the like.

Additionally amides or other nucleophile containing compounds can be reacted with the isocyanates (mono, di, and the like). Some examples include: urea, oleamide, stearamide, and the like.

Preferred precursors to the isocyanate-derived resins of the present invention include mono-, di- and other polyisocyanates. Examples of monoisocyanates include octadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6dimethylphenylisocyante; 1-naphthylisocyanate; (naphthyl)ethylisocyantes; and the like. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate ($H_2$MDI); tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6diethylphenyl isocyanate); 1,12-diisocyanatododecane; 1,5-diisocyanato-2methylpentane; 1,4-diisocyanatobutane; and cyclohexylene diisocyanate and its isomers; uretidione dimers of HDI; and the like. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like. Examples of higher isocyanate functionalities include copolymers of TDI/HDI, and the like, as well as MDI oligomers.

Any suitable reaction condition for making urethane or urea compounds by condensing alcohols and/or amines with isocyanates may be employed. Preferably, the reaction is carried out at elevated temperatures (e.g. about 60° C. to 160° C.) in the presence of a urethane reaction catalyst such as dibutyltindilaurate, bismuth tris-neodecanoate, cobalt benzoate, lithium acetate, stannous octoate or triethylamine. The reaction conditions preferably are conducted in an inert atmosphere, such as argon or nitrogen gas or other suitable atmosphere, to prevent oxidizing or yellowing the reaction products and to prevent undesirable side reactions. The mole ratio of reactants is adjusted so that the isocyanate functionalities are completely consumed in the reaction with a slight molar excess of alcohol or amine remaining. Conceptually the reactants can be added together in any order and/or added to the reaction as physical mixtures. However, in the preferred embodiments of the invention, reaction conditions and the order of the addition of reactants are carefully controlled for several reasons. First, reaction conditions and reactant additions are chosen to provide a controlled exothermic reaction. Secondly, when reacting mixtures of alcohols and/or amines with diisocyanates such as isophorone diisocyanate (IPDI), the order of addition of the different nucleophiles to the reaction is chosen to tailor the distribution of diurethane molecules, and/or mixed urethane/urea molecules, and/or diurea molecules in the final resin. When doing this, the different reactivities to isocyanates of alcohols versus amines are employed, as are the reactivities of the two separate isocyanate groups on IPDI. See J. H. Saunders and K. C. Frisch's "Polyurethanes Part I, Chemistry" published by Interscience of New York, N.Y. in 1962 and Olin Chemicals' Luxate® IM isophorone diisocyanate technical product information sheet which provide a further explanation of this chemistry. Finally, when using chromogen-containing nucleophilic molecules that have more than one nucleophile per molecule, the order of addition of the nucleophile to the reaction mixture is chosen so as to minimize the number of oligomeric species in the final resin. This is done to minimize the final viscosity of the resin. The products of this reaction are colored, generally transparent solids having melting points in the range of about 20° C. to about 150° C. and viscosities in the range of about 10 cPs to about 2000 cPs at 150° C. and $T_g$'s of about −30° C. to about 100° C.

The preferred chromogen-containing nucleophilic molecules include dyes such as those disclosed in U.S. Pat. Nos. 3,994,835 and 4,132,840, assigned to Bayer, and U.S. Pat. Nos. 4,284,729; 4,507,407; 4,751,254; 4,846,846; 4,912,203; 5,270,363 and 5,290,921 assigned to Milliken Research Corporation. Also suitable may be any Color Index (C.I.) Solvent Dyes, Disperse Dyes, modified Acid and Direct Dyes, Basic Dyes, Sulphur Dyes or Vat Dyes that contain an alcohol, amine, or other nucleophilic functional group that is capable of reacting with an isocyanate. The more preferred chromogen-containing nucleophilic molecules contain at least one alcohol functional group. Most preferably this alcohol functional group is terminal to a polyethylene oxide, polypropylene oxide, or a polyethylene/polypropylene oxide polymeric chain.

Phase change inks of the current invention incorporate the colored isocyanate-derived resin as all or a portion of their colorant. The colored isocyanate-derived resins of the current invention may be either the sole colorant material or may be used in combination with conventional phase change ink colorant materials such as Color Index (C.I.) Solvent Dyes, Disperse Dyes, modified Acid and Direct Dyes, Basic Dyes, Sulphur Dyes or Vat Dyes and/or the polymeric dyes disclosed in U.S. patent application Ser. No. 08/381,610, and/or pigments.

Besides colorant material, phase change inks of this invention contain a phase change carrier system or composition. The phase change carrier composition is generally designed for use in either a direct printing mode or for use in an offset or indirect transfer printing system. In the direct printing mode, the phase change carrier composition is generally made up of one or more chemicals that provide the necessary properties to allow the phase change ink (1) to be applied in a thin film of uniform thickness on the final receiving substrate when cooled to the ambient temperature after printing directly to the substrate; (2) to be ductile while retaining sufficient flexibility so that the applied image on the substrate will not fracture upon bending; and (3) to possess a high degree of lightness, chroma, transparency and thermal stability. In an offset or indirect transfer printing mode, the phase change carrier composition is designed to possess not only the above mentioned properties, but also certain fluidic and mechanical properties necessary for use in such a system, as described in U.S. Pat. No. 5,389,958 which is hereby incorporated by reference in pertinent part. The isocyanate-derived colored materials of the current invention are tailored to have the desirable properties mentioned above when used in the carrier composition of the inks of the present invention by varying one or more of the readily available commodity chemical precursors.

Prior art phase change inks for use in direct and indirect transfer printing systems are described in U.S. Pat. Nos. 4,889,560 and 5,372,852. These inks consist of a phase change ink carrier composition comprising one or more fatty amide-containing materials, usually consisting of a mono-amide wax and a tetra-amide resin, one or more tackifiers, one or more plasticizers and one or more antioxidants, in combination with compatible colorants. The colored isocyanate-derived resins of the present invention replace one or more of the ingredients in the above carrier. The colored isocyanate-derived resins of the present invention therefore can be used as both the colorant for the ink and as an integral part of the carrier composition. The advantages of this are:

(1) The colored resins of this invention are very compatible with conventional phase change ink carrier materials. It is common to use these colored resins so that they comprise as much as about 20% to about 30% by weight of the ink formulation and a percentage of composition of up to about 50% by weight is possible. This provides for relatively high color loadings in the ink while maintaining optimal physical properties in the ink formulation.

(2) Very high color strengths can be obtained in the ink because the colored resins can be combined with conventional colorants in the same formulation. This is important in applications where very thin films of ink are needed, such as hot melt gravure printing or very high resolution phase change ink jet printing.

(3) The colored resins of this invention are very pure, that is free of salts and other insoluble contaminants. This makes the inks made from these materials easy to filter and provides for high reliability in ink jet printing devices. This is a major advantage over many conventional phase change ink colorants.

Many other patents describe other materials for use in phase change ink jet inks. Some representative examples include the aforementioned U.S. Pat. Nos. 3,653,932; 4,390,396; 4,484,948; 4,684,956; 4,851,045; 5,006,170; 5,151,120; EP Application Nos. 0187352 and 0206286; and PCT Patent Application WO 94/04619. These other materials can include paraffins, microcrystalline waxes, polyethylene waxes, ester waxes, amide waxes, fatty acids, fatty alcohols, fatty amides and other waxy materials, sulfonamide materials, resinous materials made from different natural sources (tall oil rosins and rosin esters are an example) and many synthetic resins, oligomers, polymers, co-polymers, and ionomers. It will be obvious to those skilled in the art that the colored isocyanate-derived resins of this invention could be used as the colorant material in inks made from many different combinations of these materials.

The aforementioned U.S. Pat. No. 5,496,879 and German Patent Publications DE 4205636AL and DE 4205713AL, assigned to Siegwerk Farbenfabrik Keller, Dr. Rung and Co., describe materials used for phase change or hot melt gravure printing. It will be obvious to those skilled in the art that the colored isocyanate-derived resins of this current invention would be compatible with those materials and could also be used in that application or other similar printing methods that employ hot melt ink technology.

It also will be obvious to those skilled in the art that other ink colors besides the subtractive primary colors are desirable for applications, such as postal marking or industrial marking and labeling using phase change printing, and that this invention is applicable to these needs. Infrared (IR) or ultraviolet (UV) absorbing dyes can also be incorporated into the inks of this invention for use in applications such as "invisible" coding or marking of products.

The present invention is further described in detail by means of the following Examples and Comparisons. All parts and percentages are by weight and all temperatures are degrees Celsius unless explicitly stated otherwise. It is to be noted that while the following examples may recite only one particular colored isocyanate-derived resin, it is to be understood that each individual example is only illustrative and any of the primary colorants (cyan, yellow, magenta and black) used in subtractive color printing could be employed in each instance.

EXAMPLE 1
The Reaction Product of Octylphenol Ethoxylate, Isophorone Diisocyanate and Yellow Reactive Colorant About 525.0 grams (4.73 equiv.) of isophorone diisocyanate[1] and 1.5 grams of dibutyltindilaurate[2] catalyst, followed by about 986 grams (3.88 equiv.) of octylphenol ethoxylate[3], were added to a 3000 ml three-neck resin kettle equipped with a Trubore stirrer, $N_2$ atmosphere inlet, and a thermocouple-temperature controller. The reaction mixture was heated to about 135° C. with stirring under nitrogen. After 2.0 hours at about 135° C., about 346.1 grams (0.497 equiv.) of a yellow polymeric colorant corresponding to Colorant A from Table I of U.S. Pat. No. 5,231,135 were added and the reaction mixture was heated for approximately 2 hours. An additional about 110.0 grams (0.433 equiv.) of octylphenol ethoxylate[3] were added and the reaction mixture was heated at about 150° C. for approximately 2 hours. An FT-IR of the product was obtained to insure all of the isocyanate (NCO) functionality was consumed. The absence (disappearance) of a peak at about 2285 $cm^{-1}$ (NCO) and the appearance (or increase in magnitude) of peaks at about 1740–1680 $cm^{-1}$ and about 1540–1530 $cm^{-1}$ corresponding to urethane frequencies were used to confirm this. The diurethane reaction product was poured into aluminum molds and allowed to cool and harden. This final colored resin product was characterized by the following physical properties: viscosity of about 121 cPs as measured by a Ferranti-Shirley cone-plate viscometer at about 140° C., a melting point of about 38° C. to about 115° C. as measured by electrothermal capillary melting point apparatus, a $T_g$ of about 12.4° C. as measured by differential scanning calorimetry using a DuPont 2100 calorimeter at a scan rate of 20° C./minute, and a spectral strength of about 5634 milliliters•Absorbance Units per gram at λmax as measured by dilution in n-butanol using a Perkin Elmer Lambda 25 UV/VIS spectrophotometer.

[1] Desmodur I—Isophorone diisocyanate available from Bayer Corp. of Pittsburg, Pa.
[2] Dibutyltindilaurate available from Aldrich Chemicals of Milwaukee, Wis.
[3] IGEPAL CA-210 octylphenol ethoxylate is available from Rhone-Poulenc Co., Cranbury, N.J.

EXAMPLE 2
The Reaction Product of Octylphenol Ethoxylate, Isophorone Diisocyanate and Cyan Reactive Colorant About 525.0 grams (4.73 equiv.) of isophorone diisocyanate[1], about 1.5 grams of dibutyltindilaurate[2] catalyst, and about 992.0 grams (3.91 equiv.) of octylphenol ethoxylate[3] were added to a 3000 ml three-neck resin kettle equipped with a Trubore stirrer, a $N_2$ atmosphere inlet, and a thermocouple-temperature controller. The reaction mixture was heated to about 135° C. and held for approximately 3.5 hours with stirring under nitrogen. About 240.6 grams (0.473 equiv.) of a cyan polymeric colorant[4] then were added and the mixture was heated to about 135° C. for 2 hours. An additional about 110.0 grams (0.433 equiv.) of octylphenol ethoxylate[3] were added and the reaction mixture was heated at about 150° C. for approximately 2 hours. An FT-IR of the product was obtained to insure all of the isocyanate (NCO) functionality was consumed. The absence (disappearance) of a peak at about 2285 $cm^{-1}$ (NCO) and the appearance (or increase in magnitude) of peaks at about 1740–1680 $cm^{-1}$ and about 1540–1530 $cm^{-1}$ corresponding to urethane frequencies were used to confirm this. The diurethane reaction product was poured into aluminum molds and allowed to cool and harden. This final colored resin product was characterized by the following physical properties: viscosity of about 181.8 cPs as measured by a Ferranti-Shirley cone-plate viscometer at about 140° C., a melting point of about 59.9°–70.2° C. as measured by electrothermal capillary melting point apparatus, and a $T_g$ of about 23.1° C. as measured by differential scanning calorimetry using a DuPont 2100 calorimeter at a scan rate of 20° C./minute, and a spectral strength of about 5588 milliliters•Absorbance Units per gram at λmax as measured by dilution in n-butanol using a Perkin Elmer Lambda 25 UV/VIS spectrophotometer.

[1] Desmodur I—Isophorone diisocyanate available from Bayer Corp. of Pittsburg, Pa.
[2] Dibutyltindilaurate available from Aldrich Chemicals of Milwaukee, Wis.

[3] IGEPAL CA-210 octylphenol ethoxylate is available from Rhone-Poulenc Co., Cranbury, N.J.
[4] Experimental Blue III 9495-28 available from Milliken and Company of Spartanburg, S.C.

EXAMPLE 3
The Reaction Product of Octylphenol Ethoxylate, Isophorone Diisocyanate and Blended Black Reactive Colorants About 150.0 grams (0.295 equiv.) of a cyan polymeric reactive colorant[1], about 225.0 grams (0.147 equiv.) of a violet polymeric colorant corresponding to Colorant U from Table I of U.S. Pat. No. 5,231,135; about 345.0 grams (0.552 equiv.) of an orange polymeric reactive colorant corresponding to Colorant B from Table I of U.S. Pat. No. 5,231,135; about 450.0 grams (4.054 equiv.) of isophorone diisocyanate[2] and about 0.18 grams of dibutyltindilaurate catalyst[3] were added to a 3000 ml three-neck resin kettle equipped with a Trubore stirrer, a $N_2$ atmosphere inlet, and a thermocouple-temperature controller. The reaction mixture was heated to about 90° C. with stirring under nitrogen. After 3.5 hours at about 90° C., about 1.0 gram of additional dibutyltindilaurate catalyst[3] and about 805.0 grams (3.012 equiv.) of octylphenol ethoxylate[4] were added and the temperature was raised to about 130° C. and held for approximately 3.5 hours. An FT-IR of the product was obtained to insure all of the isocyanate (NCO) functionality was consumed. The absence (disappearance) of a peak at about 2285 $cm^{-1}$ (NCO) and the appearance (or increase in magnitude) of peaks at about 1740–1680 $cm^{-1}$ and about 1540–1530 $cm^{-1}$ corresponding to urethane frequencies were used to confirm this. The diurethane reaction product was poured into aluminum molds and allowed to cool and harden. This final colored resin product was characterized by the following physical properties: viscosity of about 163.0 cPs as measured by a Ferranti-Shirley cone-plate viscometer at about 140° C., a melting point of below ambient temperature and not measurable by electrothermal melting point apparatus, a $T_g$ of about 3.8° C. as measured by differential scanning calorimetry using a DuPont 2100 calorimeter at a scan rate of 20° C./minute, and a spectral strength of about 4667 milliliters•Absorbance Units per gram at λmax as measured by dilution in n-butanol using a Perkin Elmer Lambda 25 UV/VIS spectrophotometer.

[1] Experimental Blue III 9495-28 available from Milliken and Company of Spartanburg, S.C.
[2] Desmodur I—Isophorone diisocyanate available from Bayer Corp. of Pittsburg, Pa.
[3] Dibutyltindilaurate available from Aldrich Chemicals of Milwaukee, Wis.
[4] Triton X15 octylphenol ethoxylate is available from Union Carbide Chemicals and Plastics Company Inc., of Danbury, Conn.

EXAMPLE 4
The Reaction Product of Hydroabietyl Alcohol, Octadecyl Amine, Cyan Reactive Colorant, and Isophorone Diisocyanate About 150.0 grams (1.35 equiv.) of isophorone diisocyanate[1] and about 0.22 grams of dibutyltindilaurate[2] catalyst, about 240.2 grams (0.676 equiv.) of hydroabietyl alcohol[3], preheated to about 90° C., were added to a 1000 ml three-neck resin kettle equipped with a Trubore stirrer, a $N_2$ atmosphere inlet, and a thermocouple-temperature controller. The reaction mixture was heated to about 130° C. under nitrogen. After 1 hour at room temperature, about 90.9 grams (0.338 equiv.) of octadecyl amine[4] were added and the temperature raised to about 150° C. and held for approximately 1 hour. A cyan polymeric reactive colorant (about 68.8 grams, 0.1352 moles) was then added and allowed to react for 2 hours. Additional hydroabietyl alcohol[3] (about 73.7 grams, 0.2073 moles), preheated to about 90° C., was added and the reaction temperature was increased to about 155° C. and held for 2 hours. An FT-IR of the product was obtained to insure all of the isocyanate (NCO) functionality was consumed. The absence (disappearance) of a peak at about 2285 $cm^{-1}$ (NCO) and the appearance (or increase in magnitude) of peaks at about 1705–1635 $cm^{-1}$ and about 1515–1555 $cm^{-1}$ corresponding to urea frequencies and at about 1740–1680 $cm^{-1}$ and about 1540–1530 $cm^{-1}$ corresponding to urethane frequencies were used to confirm this. The urethane/urea reaction product was poured into aluminum molds and allowed to cool and harden. This final colored resin product was characterized by the following physical properties: viscosity of about 419.5 cPs as measured by a Ferranti-Shirley cone-plate viscometer at about 140° C., a melting point of about 49.7°–119.7° C. as measured by an electrothermal capillary melting point apparatus, a $T_g$ of about 15.5° C. as measured by differential scanning calorimetry using a DuPont 2100 calorimeter at a scan rate of 20° C./minute, and a spectral strength of about 4436 milliliters•Absorbance Units per gram at λmax as measured by dilution in n-butanol using a Perkin Elmer Lambda 25 UV/VIS spectrophotometer.

[1] Luxate IM—Isophorone diisocyanate available from OLIN Corp. of Stanford, Conn.
[2] Dibutyltindilaurate available from Aldrich Chemicals of Milwaukee, Wis.
[3] Abitol E—Hydroabietyl alcohol available from Hercules inc., of Wilmington, Del.
[4] ARMEEN 18D FLK—Octadecyl amine available from AKZO NOBEL Chemicals Inc. of McCook, Ill.
[5] Experimental Blue III 9495-28 available from Milliken and Company of Spartanburg, S.C.

EXAMPLE 5
The Reaction Product of Octadecyl Amine, Yellow Reactive Colorant and Isophorone Diisocyanate About 150.0 grams (1.35 equiv.) of isophorone diisocyanate[1] and about 0.22 grams of dibutyltindilaurate[2] catalyst were added to a 1000 ml three-neck resin kettle equipped with a Trubore stirrer, a $N_2$ atmosphere inlet, and a thermocouple-temperature controller. About 272 grams (1.011 equiv.) of octadecyl amin[3] were added over 1 hour while heating to about 145° C. under nitrogen. The reactive diurea mixture was held at temperature for 1 hour and a yellow polymeric colorant corresponding to Colorant A from Table I of U.S. Pat. No. 5,231,135 (about 98.9 grams, 0.142 equiv.) was then added and allowed to react with the remaining isophorone diisocyanate for 3 hours. Additional octadecyl amine[3] (about 60.0 grams, 0.223 equiv.) was then added to ensure complete consumption of the isophorone diisocynate and the temperature increased to 155° C. and held for 2 hours. An FT-IR of the product was obtained to insure all of the isocyanate (NCO) functionality was consumed. The absence (disappearance) of a peak at about 2285 $cm^{-1}$ (NCO) and the appearance (or increase in magnitude) of peaks at about 1705–1635 $cm^{-1}$ and about 1515–1555 $cm^{-1}$ corresponding to urea frequencies were used to confirm this. The urethane colorant modified diurea resin reaction product was poured into aluminum molds and allowed to cool and harden. This final colored resin product was characterized by the following physical properties: viscosity of about 325.0 cPs as measured by a Ferranti-Shirley cone-plate viscometer at about 140° C., a melting point of about 83.2° C. to about 124.7° C. as measured by differential scanning calorimetry using an electrothermal capillary melting point apparatus, and a $T_g$ of about −15.8° C. as measured by differential scanning calorimetry using a DuPont 2100 calorimeter at a scan rate of 20° C./minute, and a spectral strength of about 2532 milliliters•Absorbance Units per gram at λmax as measured by dilution in n-butanol using a Perkin Elmer Lambda 25 UV/VIS spectrophotometer.

[1] Luxate IM—Isophorone diisocyanate available from OLIN Corp. of Stanford, Conn.
[2] Dibutyltindilaurate available from Aldrich Chemicals of Milwaukee, Wis.
[3] ARMEEN 18D FLK—Octadecyl amine available from AKZO NOBEL Chemicals Inc. of McCook, Ill.

EXAMPLE 6
Yellow Ink Made From Amide Wax, Tetra-amide Resin and Colored Urethane Resin In a stainless steel beaker were combined about 500 grams of Witco S-180 stearyl stearamide[1], about 125 grams of Union Camp Unirez 2970 tetra-amide resin[2], about 208 grams of the reaction product colored resin from Example 1, and about 1.6 grams of Uniroyal Naugard 445 antioxidant[3]. The materials were melted together at a temperature of about 140° C. in an oven, then blended by stirring in a temperature controlled mantle at about 115° C. for about ½ hour. After stirring, the yellow ink was filtered through a heated Mott apparatus (available from Mott Metallurgical) using #3 Whatman filter paper and a pressure of about 15 psi. The filtered phase change ink was poured into molds and allowed to solidify to form ink sticks. This final yellow ink product was characterized by the following physical properties: viscosity of about 15.6 cPs as measured by a Ferranti-Shirley cone-plate viscometer at about 140° C., a melting point of about 89° C. as measured by differential scanning calorimetry using a DuPont 2100 calorimeter, and a $T_g$ of about 8° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1635 milliliters•Absorbance Units per gram at λmax.

[1] Kemamide S-180—Stearyl stearamide available from Witco Chemical Company of Memphis, Tenn.
[2] Unirez 2970—Tetra-amide available from Union Camp Corporation of Wayne, N.J.
[3] Naugard 445—antioxidant available from Uniroyal Chemical Company of Oxford, Conn.

EXAMPLE 7
Cyan Ink Made From Amide Wax, Tackifier Resin and Colored Urethane Resin About 275 grams of Kemamide S-180 stearyl stearamide[1], about 112.5 grams of a rosin ester tackfier available commercially as Arakawa KE-100[2], about 112.5 grams of the colored resin reaction product of Example 2, and about 1.0 grams of Uniroyal Naugard 445 antioxidant[3] were combined in a stainless steel beaker. The materials were melted together at a temperature of about 140° C. in an oven, then blended by stirring in a temperature controlled mantle at about 115° C. for about ½ hour. After stirring for about ½ hour, the cyan ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 12.9 cPs as measured by a Ferranti-Shirley cone-plate viscometer at about 140° C., a melting point of about 89° C. as measured by differential scanning calorimetry using a DuPont 2100 calorimeter, and a $T_g$ of about 37° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1323 milliliters•Absorbance Units per gram at λmax.

[1] Kemamide S-180—Stearyl Stearamide available from Witco Chemical Company of Memphis, Tenn.
[2] KE-100—Glycerol ester of hydrogenated abietic (rosin) acid available from Arakawa Chemical Industries, Ltd. of Osaka, Japan.
[3] Naugard 445—antioxidant available from Uniroyal Chemical Company of Oxford, Conn.

EXAMPLE 8
Black Ink Made From Amide Wax, Tackifier Resin and Colored Urethane Resin About 275 grams of Kemamide S-180 stearyl stearamide[1], about 112.5 grams of a rosin ester tackfier available commercially as Arakawa KE-100[2], about 112.5 grams of the colored resin reaction product of Example 3, and about 1.0 grams of Uniroyal Naugard 445 antioxidant[3] were combined in a stainless steel beaker. The materials were melted together at a temperature of about 140° C. in an oven, then blended by stirring in a temperature controlled mantle at about 115° C. for about ½ hour. After stirring for about ½ hour, the black ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 12.8 cPs as measured by a Ferranti-Shirley cone-plate viscometer at about 140° C., a melting point of about 91° C. as measured by differential scanning calorimetry using a DuPont 2100 calorimeter, and a $T_g$ of about 28.1° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1006 milliliters•Absorbance Units per gram at λmax.

[1] Kemamide S-180—Stearyl Stearamide available from Witco Chemical Company of Memphis, Tenn.
[2] KE-100—Glycerol ester of hydrogenated abietic (rosin) acid available from Arakawa Chemical Industries, Ltd. of Osaka, Japan.
[3] Naugard 445—antioxidant available from Uniroyal Chemical Company of Oxford, Conn.

EXAMPLE 9
Cyan Ink Made From Amide Wax, Tackifier Resin and Colored Urethane/Urea Resin About 250 grams of Kemamide S-180 stearyl stearamide[1], about 125 grams of a rosin ester tackfier available commercially as Arakawa KE-100[2], about 125 grams of the colored resin reaction product of Example 4, and about 1.0 grams of Uniroyal Naugard 445 antioxidant[3] were combined in a stainless steel beaker. The materials were melted together at a temperature of about 140° C. in an oven, then blended by stirring in a temperature controlled mantle at about 115° C. for about ½ hour. After stirring for about ½ hour, the cyan ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 12.9 cPs as measured by a Ferranti-Shirley cone-plate viscometer at about 140° C., a melting point of about 89° C. as measured by differential scanning calorimetry using a DuPont 2100 calorimeter, and a $T_g$ of about 34° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1046 milliliters•Absorbance Units per gram at λmax.

[1] Kemamide S-180—Stearyl Stearamide available from Witco Chemical Company of Memphis, Tenn.
[2] KE-100—Glycerol ester of hydrogenated abietic (rosin) acid available from Arakawa Chemical Industries, Ltd. of Osaka, Japan.
[3] Naugard 445—antioxidant available from Uniroyal Chemical Company of Oxford, Conn.

EXAMPLE 10
Yellow Ink Made From Amide Wax, Tetra-amide Resin and Colored Urea Resin In a stainless steel beaker were combined about 250 grams of Witco S-180 stearyl stearamide[1], about 125 grams of Union Camp Unirez 2970 tetra-amide resin[2], about 125 grams of the reaction product colored resin of Example 5, and about 1.6 grams of Uniroyal Naugard 445 antioxidant[3]. The materials were melted together at a temperature of about 140° C. in an oven, then blended by stirring in a temperature controlled mantle at about 115° C. for about ½ hour. After stirring, the yellow ink was filtered through a heated Mott apparatus (available from Mott Metallurgical) using #3 Whatman filter paper and a pressure of about 15 psi. The filtered phase change ink was poured into molds and allowed to solidify to form ink sticks. This final yellow ink product was characterized by the following physical properties: viscosity of about 13.9 cPs as measured by a Ferranti-Shirley cone-plate viscometer at about 140° C., a melting point of about 91.5° C. as measured by differential scanning calorimetry using a DuPont 2100 calorimeter, and a $T_g$ of about 49° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 590 milliliters•Absorbance Units per gram at λmax.

[1] Kemamide S-180—Stearyl stearamide available from Witco Chemical Company of Memphis, Tenn.
[2] Unirez 2970—Tetra-amide available from Union Camp Corporation of Wayne, N.J.
[3] Naugard 445—antioxidant available from Uniroyal Chemical Company of Oxford, Conn.

EXAMPLE 11
Cyan Ink Made From Amide Wax, Mixed Urethane/Urea Resin and Cyan Colored Urethane Resin In a stainless steel beaker were combined about 250 grams of the cyan colored resin from Example 2 about 250 grams of the reaction product urethane/urea mixture material from Example 2, of co-pending U.S. patent application Ser. No. 08/672,816 filed concurrently herewith and assigned to the assignee of the present invention, about 540 grams of Witco S-180 stearyl stearamide[1] and about 2.0 grams of Uniroyal Naugard 445 antioxidant[2]. The materials were melted together at a temperature of 140° C. in an oven, then blended by stirring in a temperature controlled mantle at about 115° C. for about ½ hour. To this mixture was added about 5 grams of Solvent Blue 44. After stirring for about ½ hour, the cyan ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 13.0 cPs as measured by a Ferranti-Shirley cone-plate viscometer at about 140° C., a melting point of about 89° C. as measured by differential scanning calorimetry using a DuPont 2100 calorimeter, and a $T_g$ of about 27.5° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1069 milliliters•Absorbance Units per gram at λmax.

[1] Kemamide S-180—Stearyl stearamide available from Witco Chemical Company of Memphis, Tenn.
[2] Naugard 445—antioxidant available from Uniroyal Chemical Company of Oxford, Conn.

EXAMPLE 12
Yellow Ink Made From Amide Wax, Mixed Urethane/Urea Resin and Yellow Colored Urethane Resin In a stainless steel beaker were combined about 98.6 grams of the colored resin from Example 1 about 80.7 grams of the material from Example 2, of co-pending U.S. patent application Ser. No. 08/672,816, filed concurrently herewith and assigned to the assignee of the present invention, about 179 grams of Witco S-180 stearyl stearamide[1] and about 0.7 grams of Uniroyal Naugard 445 antioxidant[2]. The materials were melted together at a temperature of about 140° C. in an oven, then blended by stirring in a temperature controlled mantle at about 115° C. for about ½ hour. The yellow ink was then filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 13.6 cPs as measured by a Ferranti-Shirley cone-plate viscometer at about 140° C., a melting point of about 90° C. as measured by differential scanning calorimetry using a DuPont 2100 calorimeter, and a $T_g$ of about 20° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1497 milliliters•Absorbance Units per gram at λmax.

[1] Kemamide S-180—Stearyl stearamide available from Witco Chemical Company of Memphis, Tenn.
[2] Naugard 445—antioxidant available from Uniroyal Chemical Company of Oxford, Conn.

EXAMPLE 13
Black Ink Made From Amide Wax, Mixed Urethane/Urea Resin and Black Colored Urethane Resin In a stainless steel beaker were combined about 301 grams of the colored resin from Example 3 about 374 grams of the reaction product urethane/urea mixture material from Example 2, of co-pending U.S. patent application Ser. No. 08/672,816, filed concurrently herewith and assigned to the assignee of the present invention, about 802 grams of Witco S-180 stearyl stearamide[1] and about 3.0 grams of Uniroyal Naugard 445 antioxidant[2]. The materials were melted together at a temperature of about 140° C. in an oven, then blended by stirring in a temperature controlled mantle at about 115° C. for about ½ hour. The black ink was then filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 13.3 cPs as measured by a Ferranti-Shirley cone-plate viscometer at about 140° C., a melting point of about 89° C. as measured by differential scanning calorimetry using a DuPont 2100 calorimeter, and a $T_g$ of about 16° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 869 milliliters•Absorbance Units per gram at λmax.

[1] Kemamide S-180—Stearyl stearamide available from Witco Chemical Company of Memphis, Tenn.
[2] Naugard 445—antioxidant available from Uniroyal Chemical Company of Oxford, Conn.

PRINT TESTING

The inks in examples 6–10 were tested in a commercially available Tektronix Phaser 340 printer, which uses an offset transfer printing system employing the printing process described in greater detail in U.S. Pat. No. 5,389,958. All of the above inks were found to completely transfer and to give images of good color, print quality and durability either as primary colors or when used in combination with each other or the standard Phaser 340 inks.

The inks in Examples 6–10 were tested in a commercially available Tektronix Phaser 300 printer, which uses a direct printing system employing the printing process described in greater detail in U.S. Pat. No. 5,195,430. All of the above inks were found to give images of good color, print quality and durability either as primary colors or when used in combination with each other or the standard Phaser 300 inks.

While the invention has been described above with reference to specific embodiments thereof, it is apparent that many changes, modifications and variations can be made without departing from the inventive concept disclosed herein. For example, an isocyanate-derived colored resin could be formulated that is suitable for use in a phase change ink that is the reaction product of just an isocyanate, such as IPDI, and at least one chromogen-containing nucleophile, such as a Disperse Red 55 available commercially from Organic Dyestuffs Corporation, to form a non-polymeric colored resin. Accordingly, it is intended to embrace all such changes, modifications and variations that fall within the spirit and broad scope of the appended claims. All patent applications, patents and other publications cited herein are incorporated by reference in their entirety.

What is claimed is:

1. An isocyanate-derived colored resin comprising the reaction product of:
   (a) an isocyanate; and
   (b) at least one chromogen-containing nucleophile.

2. An isoryanate-derived colored resin comprising the reaction product of:
   (a) an isocyanate;
   (b) a first nucleophile selected from the group consisting of at least one alcohol, at least one amine, and mixtures thereof; and
   (c) at least one chromogen-containing second nucleophile.

3. The isocyanate-derived colored resin of claims 1 or 2 further comprising the chromogen-containing second nucleophile being a dye containing at least one alcohol functional group.

4. The isocyanate-derived colored resin of claim 3 further comprising the chromogen-containing nucleophile being a polymeric dye.

5. The isocyanate-derived colored resin of claim 3 further comprising the chromogen-containing second nucleophile having at least one alcohol functional group that is terminal to a butylene oxide, styrene oxide, polyethylene oxide, polypropylene oxide, or a polyethylene/polypropylene oxide polymeric chain.

6. The isocyanate-derived colored resin of claim 3 further comprising the first nucleophile being selected from the group of monohydric alcohols consisting of an aliphatic alcohol, an aromatic alcohol and derivatives thereof, an aliphatic/aromatic alcohol, a fused ring alcohol, and a multifunctional alcohol.

7. The isocyanate-derived colored resin of claim 6 further comprising the first nucleophile being selected from the group consisting of hydroabietyl alcohol, octylphenol ethoxylate, octadecyl alcohol, octadecanol, and mixtures thereof.

8. The isocyanate-derived colored resin of claim 6 further comprising the colored resin being a colored diurethane resin.

9. The isocyanate-derived colored resin of claim 2 further comprising the resin being a colored diurea resin.

10. The isocyanate-derived colored resin of claim 2 further comprising the resin being a colored urethane/urea resin.

11. The isocyanate-derived colored resin of claim 9 or 10 further comprising the first nucleophile being selected from a group of monoamines consisting of an aliphatic amine, an aromatic amine, an aliphatic/aromatic amine, a fused ring system amine, a multifunctional amine, a hydroxyl/amino containing compound, an amide and mixtures thereof.

12. The isocyanate-derived colored resin of claim 11 further comprising the first nucleophilic being octadecyl amine.

13. The isocyanate-derived resin of claim 3 further comprising the isocyanate being selected from the group consisting of a monoisocyanate, a diisocyanate, a triisocyanate, a copolymer of a diisocyanate, and a copolymer of a triisocyanate.

14. The isocyanate-derived resin of claim 13 further comprising the isocyanate being isophorone diisocyanate.

15. The isocyanate-derived colored resin of claim 2 further comprising mixing and heating the at least one alcohol and the isocyanate in an inert atmosphere.

16. The isocyanate-derived colored resin of claim 15 further comprising the inert atmosphere being a nitrogen atmosphere.

17. The isocyanate-derived colored resin of claim 2 further comprising mixing and heating the at least one alcohol and the isocyanate in the presence of a catalyst.

18. A phase change ink composition comprising in combination:
   (a) a mono-amide;
   (b) a tackifier; and
   (c) a colorant comprising at least one colored isocyanate-derived resin.

19. The phase change ink composition of claim 18 further comprising the colored isocyanate-derived resin being a colored diurethane resin.

20. The phase change ink composition of claim 18 further comprising an anti-oxidant.

21. The phase change ink composition of claim 18 further comprising the colored isocyanate-derived resin being the reaction product of:
   (a) an isocyanate,
   (b) a first nucleophile selected from the group consisting of at least one alcohol, at least one amine, and mixtures thereof; and
   (c) at least one chromogen-containing second nucleophile.

22. The phase change ink composition of claim 21 further comprising the at least one alcohol being a monohydric alcohol selected from the group consisting of an aliphatic alcohol, an aromatic alcohol and derivatives thereof, an aliphatic/aromatic alcohol, a fused ring alcohol, and a multifunctional alcohol.

23. The phase change ink composition of claim 22 further comprising the at least one alcohol being selected from the group consisting of hydroabietyl alcohol, octylphenol ethoxylate, octadecyl alcohol, octadecanol, and mixtures thereof.

24. The phase change ink composition of claim 21 further comprising at least one amine being a monoamine selected from the group consisting of an aliphatic amine, an aromatic amine, an aliphatic/aromatic amine, a fused ring system amine, a multifunctional amine, a hydroxyl/amino containing compound, an amide and mixtures thereof.

25. The phase change ink composition of claim 24 further comprising the monoamine being octadecyl amine.

26. The phase change ink composition of claim 21 further comprising the isocyanate being selected from the group consisting of a monoisocyanate, a diisocyanate, a triisocyanate, a copolymer of a diisocyanate, and a copolymer of a triisocyanate.

27. The phase change ink composition of claim 26 further comprising the isocyanate being isophorone diisocyanate.

28. The phase change ink composition of claim 21 further comprising mixing and heating the first nucleophile and the isocyanate in an inert atmosphere.

29. The phase change ink composition of claim 28 further comprising the inert atmosphere being a nitrogen atmosphere.

30. The phase change ink compositon of claim 18 further comprising a tetra-amide.

31. The phase change ink composition of claim 24 further comprising the colored isocyanate-derived resin further being a colored urethane/urea resin.

32. The phase change ink composition of claim 24 further comprising the colored isocyanate-derived resin being a colored diurea resin.

33. A method for producing a layer of phase change colored ink on a surface of a substrate, which comprises:
   (1) forming a phase change ink composition in the solid phase comprising an admixture of (a) a phase change carrier composition and (b) a compatible phase change colorant comprising at least one colored isocyanate-derived resin formed by the reaction of an isocyanate precursor and at least one alcohol;
   (2) transferring said solid phase, phase change color ink composition to a phase change ink application means;
   (3) raising the operating temperature of said application means to a level whereby a liquid phase, phase change colored ink composition is formed;
   (4) providing a substrate in proximity to said application means;
   (5) applying a predetermined pattern of said liquid phase, phase change colored ink composition to at least surface of said substrate; and
   (6) lowering the temperature of said applied ink composition to form a solid phase, phase change ink pattern on the substrate.

34. A method for producing a layer of phase change colored ink on a surface of a substrate, which comprises:
   (1) employing in a printing apparatus a phase change ink composition in the solid phase comprising an admixture of (a) a phase change carrier composition and (b) a compatible phase change colorant comprising at least one colored isocyanate-derived resin formed by the reaction of an isocyanate precursor and at least one alcohol;
   (2) applying the phase change ink composition in a desired pattern to an intermediate transfer surface; and
   (3) transferring the desired pattern of the phase change ink composition to the surface of the substrate.

35. The isocyanate-derived colored resin of claim 3 further comprising the chromogen-containing second nucleophile having at least one alcohol functional group that is terminal to an alkylene oxide polymeric chain.

* * * * *